United States Patent

[11] 3,542,391

| [72] | Inventor | Janvier F. O'Hara<br>757 Idle Hour Lane, Sierra Madre,<br>California 91024 |
|---|---|---|
| [21] | Appl. No. | 867,052 |
| [22] | Filed | Oct. 16, 1969<br>Continuation-in-part of Ser. No.<br>732,199, May 27, 1968, abandoned |
| [45] | Patented | Nov. 24, 1970 |

[54] VELOCIPEDE AXLE JOURNALING
4 Claims, 5 Drawing Figs.

[52] U.S. Cl. .................................................. 280/87.02,
280/1.1, 280/282; 46/221, Des 34/15
[51] Int. Cl. .................................................. B62b 7/00,
B62k 9/02
[50] Field of Search .......................................... 280/87.01,
87.02, 1.1, 1.11, 1.12, 282, 259; 46/221, 222, 201

[56] References Cited
UNITED STATES PATENTS

| 2,755,095 | 7/1956 | Douglas.......................... | 280/1.12 |
| 3,039,791 | 6/1962 | Horowitz........................ | 280/259 |
| 3,372,512 | 3/1968 | Cremer.......................... | 46/221 |
| 3,389,496 | 6/1968 | Cremer.......................... | 46/221 |
| 3,389,497 | 6/1968 | Cremer.......................... | 46/221 |

FOREIGN PATENTS

| 659,472 | 3/1963 | Canada ......................... | 280/282 |

Primary Examiner—Leo Friaglia

ABSTRACT: A velocipede having its carriage made as a thin-walled hollow shell and of a thermoplastic material, in which the carriage includes a wall segment having a wheel axle journaled in the segment. The segment is capable of transmitting axial and thrust loads from the axle and into the relatively weak carriage shell for producing a condition of reduced mechanical stress in the shell. The wall segment may also be employed at the journaling of a steering post, and may include axle and post bearings if preferred.

Patented Nov. 24, 1970 3,542,391

INVENTOR
James F. O'Hara

VELOCIPEDE AXLE JOURNALING

This application is a continuation-in-part of my copending U.S. Pat. application for Ser. No. 732,199, filed by me on May 27, 1968 and now abandoned.

This invention relates to improvements in velocipedes.

The ability in recent years to produce a velocipede having a carriage in three-dimensional form, and as a single or multiple-part hollow shell of thin walls, uniform wall thickness, and of a Thermoplastic material such as polyethylene, has permitted the velocipede to better simulate various objects such as animal figures and automobiles, or to have any ornamental shape as preferred.

The different molding processes for thermoplastic materials characteristically require a uniform thickness in the molded article, and for velocipedes the thickness is usually one-sixteenth inch to one-eighth inch. This thin wall and the relatively soft thermoplastic material of the carriage creates a problem in the wheel axle and steering post journaling to the velocipede carriage in that rough usage of the velocipede may rip or otherwise damage the carriage at the axle or post journaling, as might be expected when a velocipede wheel strikes a curb or wall. The problem increases with the age of the velocipede in that outdoor exposure of the thermoplastic carriage progressively weakens the thermoplastic material of the carriage. Consideration is also to be given to outdoor summer sun exposure which heats the thermoplastic carriage to a temperature sufficient to further soften the carriage and produce increased susceptibility to damage in the carriage. For reasons of cost and weight it is not desirable to make the entire carriage thicker in its walls in order that the locally affected areas of the carriage be thicker, although it is to be admitted that some velocipedes are made with walls of insufficient thickness to begin with. Definition of a suitable wall thickness is reached in a balance of preference, judgment, and public reaction. The wall thickness of a chain-driven velocipede should obviously be greater than for a walker type of velocipede, and the age and size of the vehicle rider and his size of velocipede also relate to wall thickness.

It is the object of this invention to construct a velocipede having a carriage wall of a thin thermoplastic material, and to journal axial rotating shafts, i.e., a wheel axle and steering post, to the carriage wall by new means capable capable of transmitting applied loads from the shafts into the carriage wall at a reduced level of mechanical stress in the wall which is consistent with the thinness and relative softness of the carriage wall.

It is another object that the new means may also function as antiwear, antifriction bearings, or include such bearings, as preferred.

It is another object that the new means may also function as a cover over an access hole in the carriage wall.

The means for any transmittal of applied loads from an axle into the adjacent carriage wall relates to the character of the structures involved. The simplest means for such transmittal is to provide a hole in the carriage wall to fit the axle, but this construction is principally the one which the invention improves upon. The use of conventional sleeve and roller bearings in an axle journaling does not suggest more than an antifriction, antiwear device fitted into or on a carriage wall, while a mounting-plate type of construction for carrying the axle and attached to the carriage by a required myriad of screws, bolts, or rivets is a relatively awkward and often abused form of axle journaling in its absence of the proper quantity of fasteners. The use of hard and tough thermoplastics such as nylon and polycarbonate for the carriage is not practical inasmuch as the cost of these materials discourages their use in competitively priced velocipedes.

The invention employs the principle of removing or recessing a portion of the weak carriage wall, then to either "graft" or hold a stronger wall segment in position in the wall hole or recess, the segment carrying the wheel axle or steering post. The wall segment, when carrying an applied load from an axle, will transmit an axial load into the adjacent edge of the carriage wall as a compressive load, and will transmit a thrust load as a bending load in the carriage wall. Importantly, the direction of transmittal of the axial load occurs in the mean plane of the adjacent carriage wall and from a butt-joint construction between the carriage wall and the wall segment. The wall segment is of relatively large size and at least as thick at its rim as the thickness of the carriage wall to present a large surface area at the butt joint and with a corresponding reduction in mechanical stress in the carriage wall. As the carriage wall is made thinner as preferred, the wall segment is made s correspondingly larger to preserve the minimum effective butted surfaces area required.

The invention relates to a relatively small panel size for meeting the minimum load transmission requirement, but the wall segment may be of any larger size as preferred, and may be large enough to be employed as a cover over a large hole in the carriage wall in which the hole is used as an access into the carriage interior.

The successful employment of the invention will largely determine whether the useful life of the velocipede extends to an aged and weatherbeaten vehicle, or is terminated by a few hours or days of rough usage which only a child rider can produce.

These and other more specific objectives will be more readily understood upon reading the following specification and claims in conjunction with the attached drawings to which they relate.

Referring to the drawings.

Figure 1:
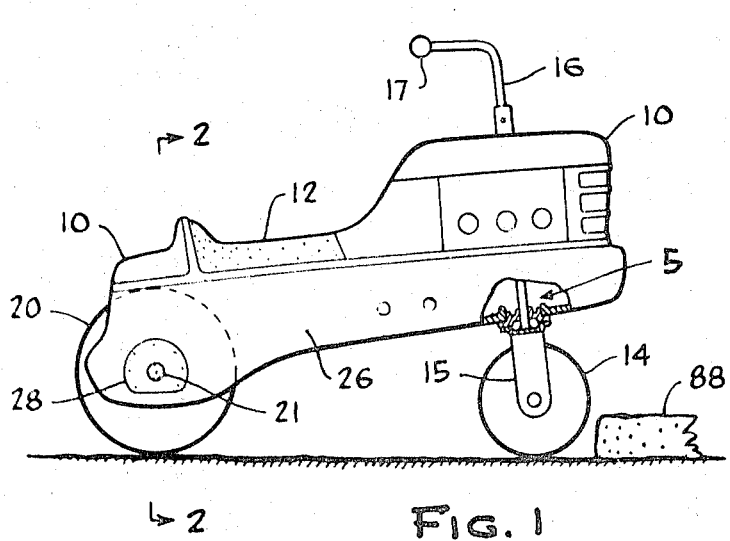
FIG. 1 is an elevation view of a velocipede of the invention.

FIG. 1 shows the velocipede as comprising a carriage 10 having a riders seat 12. A steerable front wheel 14 is connected to a wheel fork 15, steering post 16, and handlebar 17, the steering post being journaled through the carriage as shown. A pair of rear wheels, of which only the left wheel 20 is shown for clarity in the drawing of the carriage, are connected to an axle 21 which is journaled through the carriage.

The entire velocipede carriage is made as a thin-walled hollow shell of uniform wall thickness and of a thermoplastic polyethylene material, typically as produced by the well known rotational molding process. The velocipede shown is characteristic of the "walker" type vehicle which is propelled by ground traction of the riders feet, but the velocipede may be pedal cranked or otherwise rider propelled as preferred.

Figure 2:
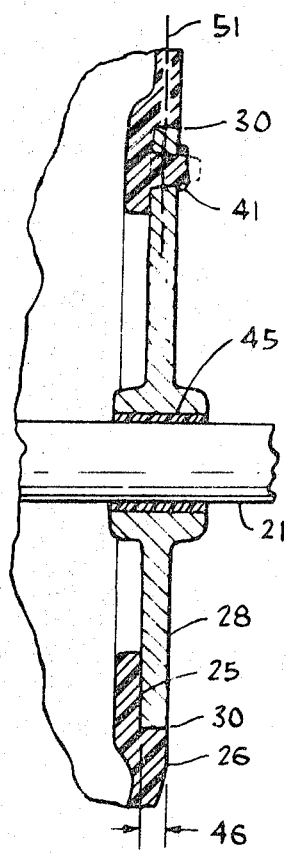
FIG. 2 is a sectional view of a portion of the velocipede of FIG. 1 and including a wheel axle of the velocipede.
Figure 3:
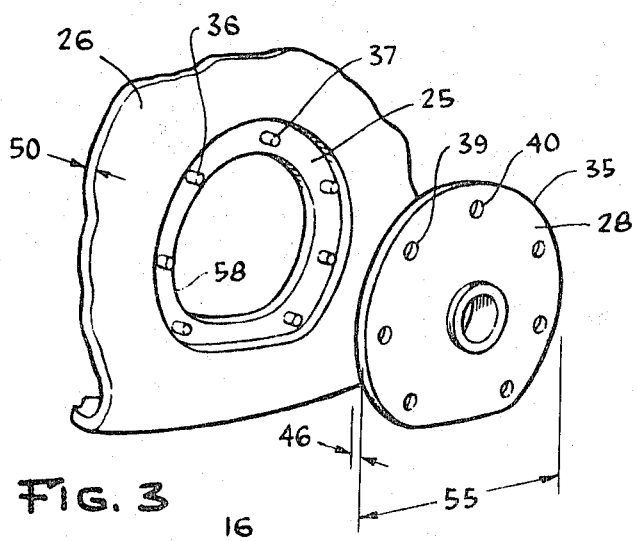
FIG. 3 is a perspective view of the apparatus of FIG. 2.

In conjunction with FIG. 1, FIGS. 2 and 3 show the detailed construction of the axle journaling for the rear wheels of the velocipede, in which the axle passes through and projects from the carriage to support the two rear wheels.

The carriage has a recessed portion 25 in its wall 26 into which a wall segment 28 is snugly fitted to provide a butt-joint 30 around the rim 35 of the a wall segment and with the carriage wall. A plurality of projecting pins 36, 37 of the carriage wall are alined and sized to fit into holes 39, 40 of the wall segment for subsequent heat forming to produce rivets, as at the rivet 41, for holding the wall segment in position on the carriage. The rivet form of attachment shown is well known in the art, but other attachment means as preferred may be employed.

The axle, conventionally of 5/16-inch to ½-inch diameter, is journaled through the wall segment by means of the conventional sleeve bearing made of a nylon material.

The wall segment at its rim is of a thickness 46 which is at least equal to the thickness 50 of the carriage wall, and is positioned with its mean-plane axis 51 alined and coinciding with the mean-plane axis of the carriage wall when the thicknesses 46 and 50 are the same, as they are in this instance in the drawing. The diameter 55 of the wall segment is at least eight times the thickness of the carriage wall when the carriage wall is oneeeighth inch thick; the diameter is inversely proportional to the carriage wall thickness which is greater or less than one-eighth inch thick.

The wall segment may be round or any other shape in its plan view as preferred, the diameter 55 being measured as the smallest circle enclosing the wall segment plan view and contacting the wall segment in at least two places.

The wall segment shown in FIGS. 1, 2, and 3 is considerably larger than a minumum diameter requirement whereby a hole 58 in the carriage wall recess is large enough to be employed as an access to the carriage interior, as might be preferred in the assembly of a chain-drive system inside the carriage of a pedal cranked velocipede.

Figure 4:
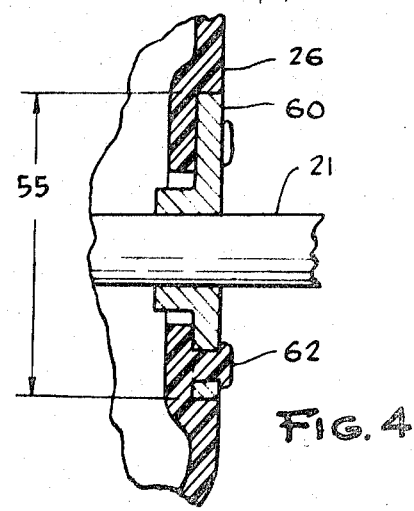
FIG. 4 is a sectional view of an alternative construction for the apparatus of FIG. 2.

FIG. 4 shows an alternative construction for the wall segment of FIGS. 2 and 3. In FIG. 4, the wall segment 60 is held in position in the recessed portion of the carriage wall by a close or tight fit with the recess and by the rivet 62, and includes the butt-joint construction as described for FIGS. 2 and 3. The wall segment 60 is of a significantly smaller diameter 55, and in this respect characterizes most applications of the invention at the rear axle of the velocipede.

The wall segment 28 of FIG. 2 and the wall segment 60 of FIG. 4 are characterized by their independence of their rivets which hold them to the carriage wall, and as relating to the wall segment transmittal of an axial load from the axle to the carriage wall. The butt joint between the wall segment and carriage wall in each instance is sufficiently close fitting or tight fitting as to carry out the axial load transmittal without assistance from the rivets.

The wall segments 28 and 60 are made of any material at least as strong as the carriage wall material, and may be of any thickness or shape, including ribbed shapes, which are consistent with accepting the mechanical stresses involved in the transfer of the axial load from the axle to the carriage wall; i.e., the wall segment does what the carriage wall alone cannot do.

The combination of wall segment rim thickness and diameter produces a butt-joint surface area which, in combination with the material and thickness of the wall segment, produces a wall segment capable of accepting the high-level stress at the central portion of the wall segment and converting this stress to a lower level at the butt joint in the direction axial load transmission.

The tight fitting wall segment is producible by first injection molding the wall segment to a preferred size, then progressively modifying the size of an insert in the carriage mold, and from an initial oversized condition, to produce an opening in the mode molded carriage which precisely fits the wall segment in the correct butt-joint condition.

In a further alternative, the stronger material of the wall segment may be replaced by a material at least as strong as the carriage wall material, and in combination with a thick thicker wall adjacent the axle; the mechanical stress being transferred is again compatible with the axial loading in an example of mechanical equivalents.

Figure 5:
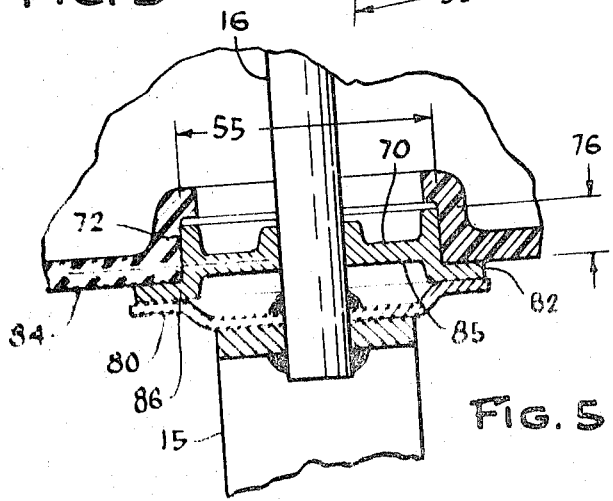
FIG. 5 is a sectional view of a portion of the velocipede of FIG. 1 and including a steering post of the velocipede.

FIG. 5 shows the construction of the journaling of the velocipede steering post, in which the wall segment 70 is positioned in the carriage wall opening 72. The wall segment has a rim thickness 76 and diameter 55 as cited for FIGS. 2 and 3. The steering post with its wheel fork and dished steel washer 80 holds the wall segment in position in the carriage wall opening by contacting the annular flange 82 of the wall segment, the flange overlapping the carriage wall underside 84. The wall segment, made of a nylon material for strength and good wear properties, includes a recess 85 on its outer face whereby thrust loads from the wheel fork and washer are directed entirely to the wall segment flange and carriage wall.

Axial loads from the steering post are transmitted to the carriage wall by means of the butt-joint 86 between the wall segment rim and carriage wall, the butt-joint being tight or loose fitting as preferred and in the absence of contributory axial load carrying members such as the rivet of FIG. 2.

In conjunction with FIG. 5, FIG. 1 shows a typical curb 88 as produced by a concrete sidewalk and which, when struck by the front wheel of the moving velocipede, provides a moment of truth in the useful life of the velocipede.

In all instances of the invention it is important that the carriage wall adjacent the wall segment be substantially in the same plane as the wall segment. Substantial changes of direction in the carriage wall should preferably occur several inches away from the butt-joint, and this may also require a consideration of the wall segment diameter and the velocipede configuration, since the kinds and amounts of mechanical stresses are involved.

There are many choices and substitutions available in the invention which relate to the scope of the claims; an the invention is a teaching instrument, and the pupil must rely upon his own skill and intuition in the application of the teaching.

The invention teaches a preferred form of the invention directed to producing optimum results; the scope of the invention however, will permit use of a wall segment whose diameter is greater than .65 inch, and independently of the thickness of the carriage wall in which the segment is used.

I claim:

1. A velocipede comprising a carriage having a wall made of a thermoplastic material of substantially uniform thickness not exceeding three-sixteenths inch and having an opening in the wall, a wall segment made of a material at least as strong as the carriage wall material and positioned in the wall opening, an axially rotatable shaft having a running wheel and journaled laterally through the wall segment, the wall segment having a rim whose thickness is at least equal to the thickness of the carriage wall and whose diameter is at least eight times the carriage wall thickness when the carriage wall is one-eighth inch thick, the minumum diameter of the wall segment being inversely proportional to the carriage wall thickness increase or decrease from one-eighth inch thickness, means for butting the rim of the wall segment with the rim of the carriage wall opening, and means for holding the wall segment in the carriage wall opening.

2. A velocipede in accordance with claim 1 wherein the wall segment includes a flange overlapping a face of the carriage wall.

3. A velocipede in accordance with claim 1 wherein the wall segment includes a flange overlapping a face of the carriage wall, and includes a recessed central portion on the outer face of the wall segment.

4. A velocipede comprising a carriage having a wall made of a thermoplastic material of substantially uniform thickness not exceeding three-sixteenths inch and having an opening in the wall, a wall segment made of a material at least as strong as the carriage wall material and positioned in the wall opening, an axially rotatable shaft having a running wheel and journaled laterally through the wall segment, the wall segment having rim whose thickness is at least equal to the thickness of the carriage wall and whose diameter is greater than .65 inch, means for butting the rim of the wall segment with the rim of the carriage wall opening, and means for holding the wall segment in the carriage opening.